(12) United States Patent
Jenny

(10) Patent No.: US 7,745,963 B2
(45) Date of Patent: Jun. 29, 2010

(54) LINEAR MOTOR WITH INTEGRATED GUIDANCE

(76) Inventor: Alois Jenny, Wiesweg 1, Root (CH) CH-6037

(*) Notice: Subject to any disclaimer, the term of this patent is extended or adjusted under 35 U.S.C. 154(b) by 151 days.

(21) Appl. No.: 11/421,744

(22) Filed: Jun. 1, 2006

(65) Prior Publication Data

US 2006/0279140 A1 Dec. 14, 2006

(30) Foreign Application Priority Data

Jun. 9, 2005 (CH) .................................. 0980/05

(51) Int. Cl.
*H02K 41/02* (2006.01)
(52) U.S. Cl. .................. 310/12.01; 310/13; 310/14; 310/15
(58) Field of Classification Search .............. 310/12, 310/13, 14, 15; *H02K 41/02*
See application file for complete search history.

(56) References Cited

U.S. PATENT DOCUMENTS

| | | | | |
|---|---|---|---|---|
| 2,672,378 A * | 3/1954 | McVey | .................. | 384/49 |
| 3,145,065 A * | 8/1964 | Cator | .................. | 384/49 |
| 3,342,534 A * | 9/1967 | King | .................. | 384/49 |
| 3,790,233 A * | 2/1974 | Polidor | .................. | 384/10 |
| 3,879,119 A * | 4/1975 | Ratowsky | .................. | 396/642 |
| 3,897,119 A * | 7/1975 | McMurtrie | .................. | 384/55 |
| 4,923,311 A * | 5/1990 | Gibbs et al. | .................. | 384/49 |
| 5,201,584 A * | 4/1993 | Simons | .................. | 384/49 |
| 5,359,245 A * | 10/1994 | Takei | .................. | 310/12 |
| 5,396,245 A * | 3/1995 | Rempfer | .................. | 341/145 |
| 5,530,303 A * | 6/1996 | Takei | .................. | 310/12 |
| 5,606,205 A * | 2/1997 | Defontaine et al. | .................. | 310/12 |
| 5,825,104 A * | 10/1998 | Kondo et al. | .................. | 310/12.27 |
| 6,326,708 B1 * | 12/2001 | Tsuboi et al. | .................. | 310/12 |
| 6,343,746 B2 * | 2/2002 | Chamot et al. | .................. | 236/34.5 |
| 6,348,746 B1 * | 2/2002 | Fujisawa et al. | .................. | 310/12 |
| 6,495,935 B1 * | 12/2002 | Mishler | .................. | 310/12.04 |
| 6,550,969 B1 * | 4/2003 | Mischler | .................. | 384/44 |
| 6,700,228 B2 * | 3/2004 | Teramachi et al. | .................. | 310/12 |
| 6,911,747 B2 * | 6/2005 | Tsuboi et al. | .................. | 310/12.05 |
| 6,917,126 B2 * | 7/2005 | Tsuboi et al. | .................. | 310/12.04 |
| 7,456,526 B2 * | 11/2008 | Teramachi et al. | .................. | 310/12 |
| 2001/0048249 A1 * | 12/2001 | Tsuboi et al. | .................. | 310/12 |
| 2001/0054851 A1 * | 12/2001 | Tsuboi et al. | .................. | 310/12 |
| 2002/0021050 A1 * | 2/2002 | Fujisawa et al. | .................. | 310/12 |
| 2002/0079747 A1 * | 6/2002 | Teramachi et al. | .................. | 310/12 |

(Continued)

FOREIGN PATENT DOCUMENTS

| | | |
|---|---|---|
| JP | 2004188566 A2 | 8/2004 |
| WO | 02060641 A1 | 8/2002 |
| WO | WO2004/086597 A1 * | 7/2004 |

*Primary Examiner*—Quyen Leung
*Assistant Examiner*—John K Kim
(74) *Attorney, Agent, or Firm*—Janet Sleath; Speckman Law Group PLLC

(57) ABSTRACT

A linear motor with an integrated guidance comprising a base plate comprising at least two side walls, and a travel plate guideably connected to the base plate in a linearly movable manner, wherein the travel plate comprises at least two rails and is connected to a plurality of rollers, wherein the plurality of rollers travel on the at least two rails.

8 Claims, 5 Drawing Sheets

U.S. PATENT DOCUMENTS

| | | | |
|---|---|---|---|
| 2002/0084701 A1* | 7/2002 | Mayer et al. | 310/12 |
| 2002/0140296 A1 | 10/2002 | Ebihara | |
| 2004/0051403 A1* | 3/2004 | Tsuboi et al. | 310/12 |
| 2005/0258688 A1* | 11/2005 | Miyamoto et al. | 310/12 |
| 2005/0258689 A1* | 11/2005 | Kitade | 310/12 |
| 2006/0232141 A1* | 10/2006 | Teramachi et al. | 310/12 |

* cited by examiner

LINEAR MOTOR WITH INTEGRATED GUIDANCE

CROSS REFERENCE TO RELATED APPLICATIONS

This application claims priority under 35 U.S.C. §119(a) to Swiss Patent Application No. CH-0980/05, filed Jun. 9, 2005.

FIELD OF THE INVENTION

The present invention relates to a linear motor, particularly a linear motor with an integrated guidance.

BACKGROUND OF THE INVENTION

In general, linear motors are construction units suitable for comprehensive applications in automation. Conventional linear motors are often used in large units, in connection with construction of machines and semiconductor assembly. However, conventional linear motors are too large and too expensive to be used in applications such as laboratory automation, parts handling, optical testing technology, and the like. Thus, there is a need for compact and highly integrated linear motors provided with directly driven linear axes or tables and flexible fastenings.

While it is beneficial to manufacture linear motors provided with directly driven linear axes as inexpensively as possible, maintaining a high dimensional accuracy of the directly driven linear axes is important. The method accuracy of a linear motor's travel plate is generally determined by the position measurement system and the activation of the motor, and the dimensional accuracy of a linear motor is mainly affected by the guidance of the linear motor's travel plate.

Linear motors known in the art are usually provided with linear axes and compound tables. These linear motors, as disclosed in U.S. Patent Publication No. 20020140296A1, generally comprise a base plate, which is essentially a plane, a table plate movably held above the base plate, and a guiding and positioning means arranged between the base and table plates. Other linear motors known in the art are provided with analogous corresponding linear tables, as described in Japanese Patent Publication No. 2004188566A2. The above-mentioned linear motors may also be provided with guiding systems, such as rail or roller systems, which are arranged between the base and table plates. The guiding systems are usually designed as separate and pre-manufactured units and may be installed as finished elements on the linear motors. These guiding systems usually comprise two stable, precise rails, wherein roller cages or ball cages are held between the two rails. The fastening means between the base plate, the guiding system, and the travel plate of these linear motors are usually constructed very rigidly and precisely in order to provide exact guidance within the linear motors. This type of construction also allows the rails of the guiding systems, which is generally constructed of hard metals such as steel, to achieve the demanded precision and prevent wear of the rails.

In still another type of linear motors known in the art, in order to achieve high dynamics in the linear motors, the movable travel plate may be constructed with a lightweight metal, so that the mass of the travel plate is very low. However, the combination of the travel plate constructed of lightweight metal and the steel guide rails are limited in providing precise linear axes in the linear motors, because the coefficient of thermal expansion of steel and the lightweight metal are very different. Particularly, this limitation is commonly found in linear motors provided with integrated direct drives, which can cause the linear motor to heat up during operation. The heat can lead to various expansions of the metals, which in some cases, can lead to jamming of the guiding system.

Furthermore, some of these linear motors, due to the side surfaces of the linear motors and the arrangement of the base and travel plates, coupled with the intermediate arrangement of the respectively required rails, may not be suitable for use in some assembly systems. A solution to this limitation has been suggested in PCT Publication No. W002060641A1, which discloses a linear table comprising a base plate and side walls manufactured from a mono-block. However, the linear table is moved by way of a traction system, and the actual drive is not arranged between the two rails and the base plate and travel plate.

SUMMARY OF THE INVENTION

A linear motor with integrated guidance is provided. The inventive linear motor comprises a base plate, a travel plate guidably connected to the base plate in a linearly movable manner, and a plurality of rollers connected to the base plate and travel plate. The linear motor further comprises at least two rails on which the plurality of rollers travel, and a linear drive and a position measurement system are arranged in a region between the rails.

The base plate is integrated with at least two side walls, which collectively forms a mono-block. The travel plate is movably connected to the side walls of the base plate and is laterally movable between the two side walls. The mono-block may be provided with end-side covers and the travel plate may also be provided with end-side covers. The side wall comprises a plurality of threaded bores, which are staggered in height and in an alternating manner.

The mono-block is provided with a first and second longitudinal groove positioned on the inner side of each side wall. The longitudinal grooves extend over the entire or substantially the entire length of the side walls. The first longitudinal groove is formed deeper on a first side of the side wall than the second longitudinal groove formed on a second side of the side wall. Similarly, the travel plate is provided with a first and second longitudinal groove positioned on the inner side of the travel plate, and they extend over the entire or substantially the entire length of the travel plate. The mono-block longitudinal grooves and travel plate longitudinal grooves complement each other in a congruent or matching manner.

At least one runner rod is arranged in the corners of each longitudinal groove. In another embodiment, at least two runner rods are arranged in the corners of each longitudinal groove. A cross roller cage is arranged in a floating manner between the runner rods positioned within the longitudinal groove. The cross roller cage comprises a cage provided with a plurality of rollers. The rollers are rotatably mounted on the cage at uniform distances. In one embodiment, the rollers are each arranged offset in an alternating manner by about 90° and each roller contacts a runner rod.

The longitudinal groove of the mono-block may further be provided with a bias rod in a freely movable manner, and the runner rods positioned in the deeper longitudinal groove contacts bias rod. Threaded holes are incorporated in the corresponding side wall, and at least one setting screw, which presses onto the bias rod, is mounted in the threaded holes. By way of this arrangement, the cross roller cages and the runner rods are displaced transversely to the travel plate.

BRIEF DESCRIPTION OF THE DRAWINGS

The present invention will be described in greater detail in the following detailed description, with reference to the accompanying drawings, wherein.

DETAILED DESCRIPTION OF THE INVENTION

Figure 1:
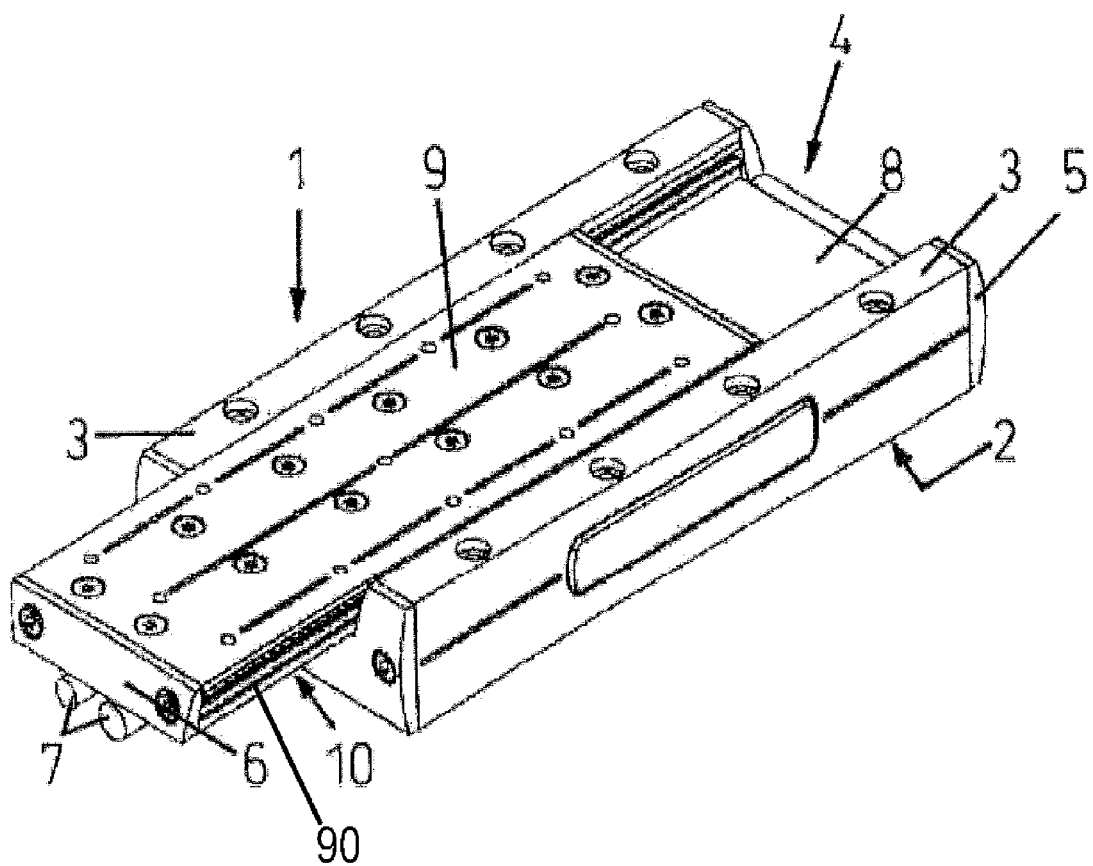
FIG. 1 shows a perspective assembled view of an embodiment of the inventive linear motor with an integrated guidance.
Figure 2:
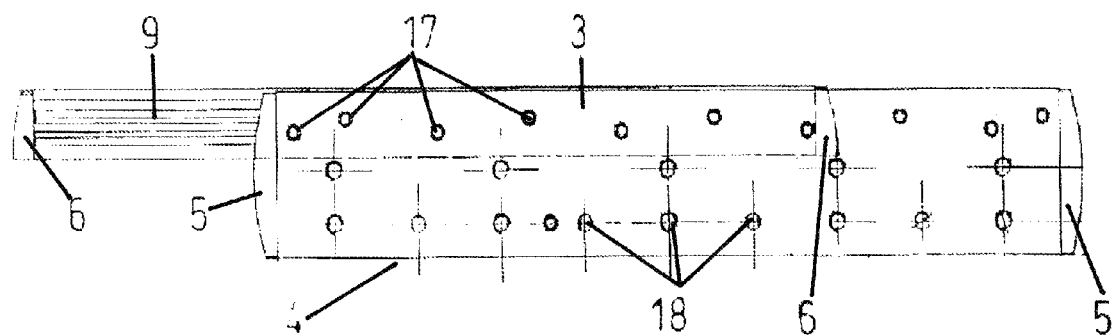
FIG. 2 shows a side view of the linear motor of FIG. 1.

FIG. 1 shows a perspective assembled view of an embodiment of the inventive linear motor 1 with an integrated guidance. Linear motor 1 comprises a base plate 2, a travel plate 9, and at least two side walls 3. Base plate 2 is integrated with the at least two side walls 3, which collectively forms a mono-block 4. Travel plate 9 is movably connected to mono-block 4 and is laterally movable between the two side walls 3. Base plate 2 and travel plate 9 may be formed of any metal, for example, aluminum. Linear motor 1 further comprise a linear drive (not shown in the figures) integrated with mono-block 4 and travel plate 9. The linear drive is supplied and activated by way of a supply cable and a control lead cable 7. Parts of the linear drive integrated with mono-block 4 are enclosed or substantially enclosed by a covering 8; thus the linear drive is not visible from mono-block 4. Mono-block 4 may further be provided with end-side cover 5 and travel plate 9 may be provided with end-side cover 6. As shown in FIG. 2, side wall 3 comprises a plurality of threaded bores 18 and a plurality of threaded bores 17, which are not shown in FIG. 1. The plurality of threaded bores 18 and the plurality of threaded bores 17 are staggered in height and in an alternating manner.

Figure 3:
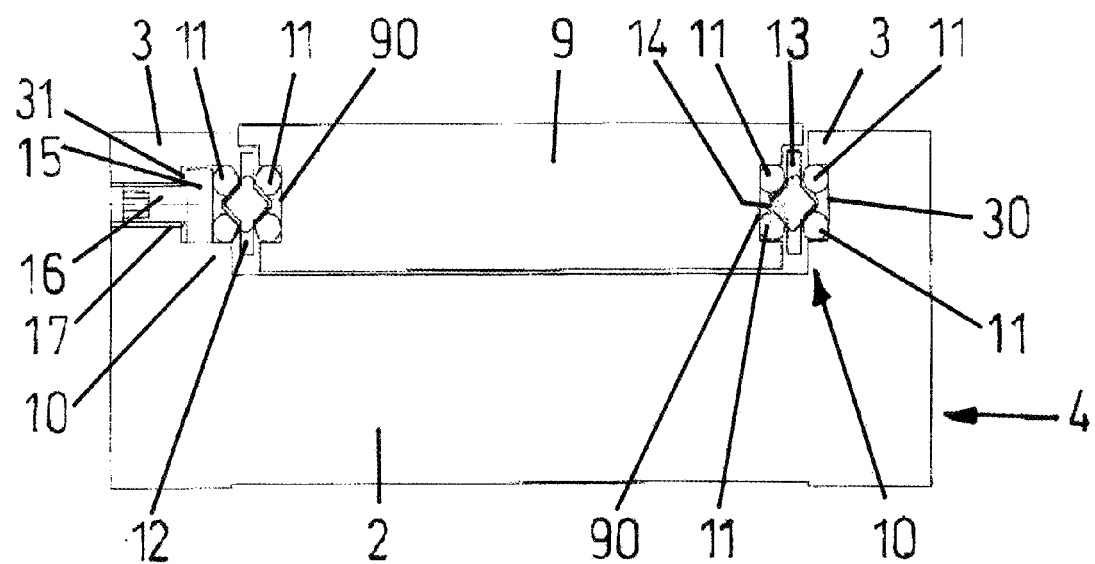
FIG. 3 shows another side view of the linear motor of FIG. 1.

FIG. 3 shows linear motor 1 provided with the longitudinal guidance 10 of travel plate 9 in mono-block 4. As shown in FIG. 3, mono-block 4 comprises base plate 2 and two side walls 3 connected thereto as one piece, and mono-block 4 is provided with a longitudinal groove 30, 31 positioned on the inner side of each side wall 3. Longitudinal grooves 30 and 31 extend over the entire or substantially the entire length of side walls 3. Similarly, travel plate 9 is provided with at least one longitudinal groove 90 positioned on the inner side of travel plate 9, and longitudinal groove 90 extends over the entire or substantially the entire length of travel plate 9. Longitudinal grooves 30 and 31 and longitudinal groove 90 complement each other in a congruent or matching manner. As shown in FIG. 3, longitudinal groove 31 is formed deeper on a first side of side wall 3 than longitudinal groove 30 formed on a second side of side wall 3. At least one runner rod 11 is arranged in the corners of each longitudinal groove 30, 31, and 90. In another embodiment, at least two runner rods 11 are arranged in the corners of each longitudinal groove 30, 31, and 90. Runner rods 11 have rounded or circularly round cross sectional configurations, although other suitable configurations may be utilized. Runner rods 11 are not secured to longitudinal grooves 30, 31, and 90 with additional means.

As shown in FIG. 3, a cross roller cage 12 is arranged in a floating manner between runner rods 11 positioned within longitudinal grooves 30 and 90, or longitudinal grooves 31 and 90. Any cross roller cages known in the art, with various suitable dimensions, may be used in connection with the inventive linear motor 1. In this embodiment, cross roller cage 12 comprises a cage 13 provided with a plurality of rollers 14. Rollers 14 are rotatably mounted on cage 13 at uniform distances. Rollers 14 are each arranged offset in an alternating manner by about 90° and each roller 14 contacts one runner rod 11. In the embodiment shown in FIG. 3, roller 14 travels on runner rod 11 at a plane runner surface of runner rod 11. In this embodiment, a first roller 14 travels on a lower runner rod 11 arranged in groove 90 of travel plate 9; a second roller 14 travels on a lower runner rod 11 in groove 30 or 31 of side wall 3; a third roller 14 travels on an upper runner rod 11 in groove 90, and a fourth roller 14 travels on an upper runner rod 11 in groove 30 or 31. The sequence of the rollers 14 and their corresponding runner surfaces may be constantly repeated. In another embodiment, two adjacent rollers 14 may travel on runner rods 11 that lie diagonally opposite one another. In another embodiment of the inventive linear motor 1, instead of cross roller cages, linear motor 1 may comprise ball cages, wherein roller balls and roller rods fit together in a complementary manner.

In the embodiment shown in FIG. 3, longitudinal groove 31 comprises a bias rod 15 in a freely movable manner, and runner rods 11 positioned in longitudinal groove 31 contacts bias rod 15. Threaded holes 17 are incorporated in the corresponding side wall 3, and at least one setting screw 16, which presses onto the bias rod 15, is mounted in threaded holes 17. By way of this arrangement, all rollers or cross roller cages 12, as well as all runner rods 11, are displaced transversely to travel plate 9. In a small linear motor 1, it is sufficient to provide a row of setting screws 16 which press onto bias rod 15 centrically with respect to the height of bias rod 15. In a large linear motor 1, since the height of bias rod 15 is greater, setting screws 16 may rest in the upper half or in the lower half of bias rod 15 in an alternating manner. In this embodiment, threaded holes 17 are arranged accordingly, which is illustrated in FIG. 2.

Figure 4:
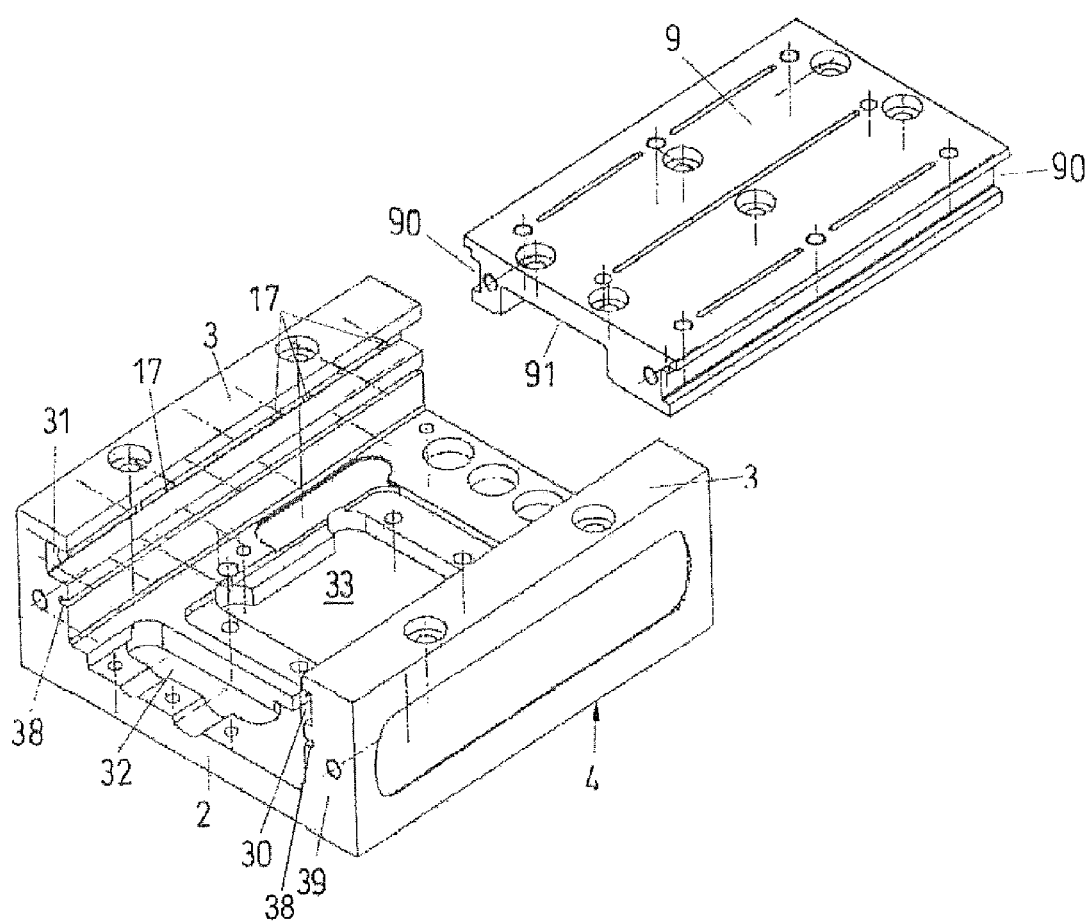
FIG. 4 shows a perspective exploded view of the linear motor of FIG. 1.

FIG. 4 shows an exploded perspective view of the inventive linear motor 1. As shown in FIG. 4, mono-block 4 comprises base plate 2 and two side walls 3 and longitudinal grooves 30 and 31 are milled into side walls 3 on its inner side. Longitudinal groove 31 has a deeper groove than that of longitudinal groove 30. Threaded holes 17 communicate with longitudinal groove 31. Various recesses or deepenings are shown between the two side walls 3 in base plate 2. Thus, an elongate recess 32 arises which runs parallel to end side 39, of mono-block 4. Two recesses are arranged between recess 32 and end side 39, in which cables 7 at least partly come to lie. Cables 7 may be fastened with a cable clamp (not shown) on mono-block 4 with a positive fit and/or a non-positive fit. The cable clamp serves for cable strain relief and may also serve for connecting a metallic shielding of a cable to the earth of the linear motor.

End-side cover 5, which is not shown in FIG. 4, may be screwed onto mono-block 4 through insert groove 38. End-side cover 5 thereby not only serves for the aesthetics, but also simultaneously serves as, an abutment for runner rods 11 which as a result are held in an undisplaceable manner in the longitudinal direction.

A centric deepening 33 is formed in base plate 2 of mono-block 4, which serves for receiving an exciter coil unit 34. A plurality of holes or threaded holes are positioned in front of and behind centric recess 33 in the longitudinal direction of mono-block 4, which serve for fixing exciter coil unit 34 by way of suitable holding plates.

Figure 5:
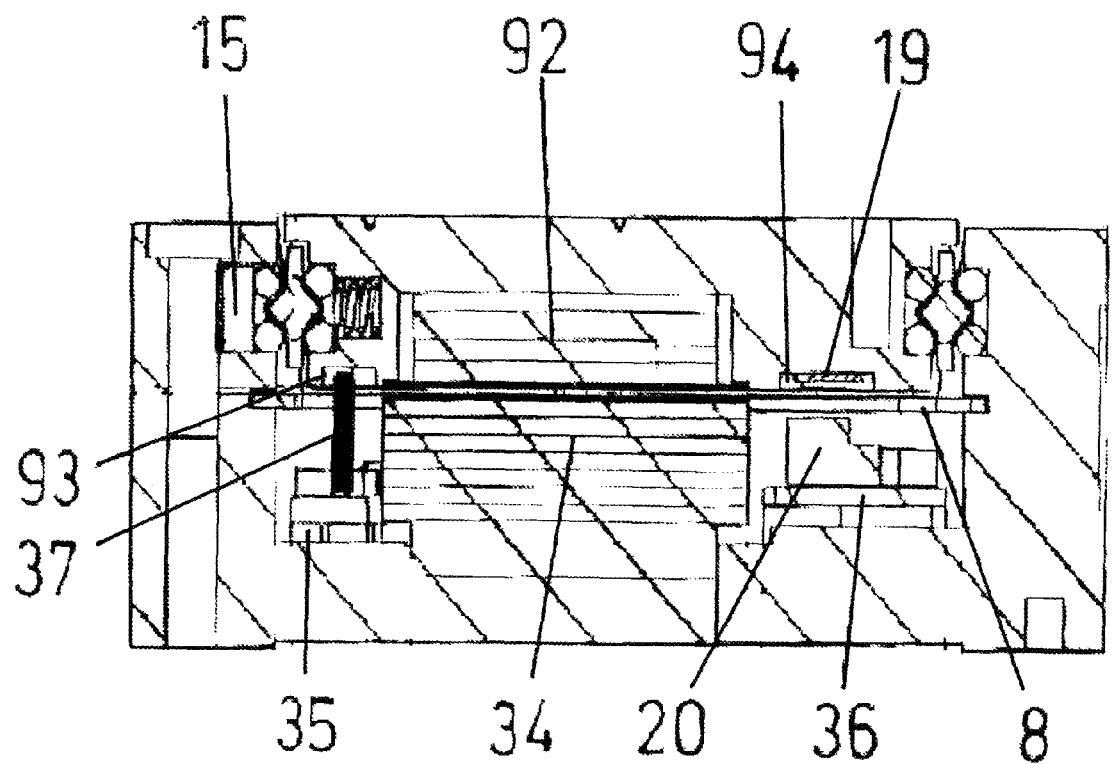
FIG. 5 shows a cross-sectional view of the linear motor of FIG. 1.

As shown in FIG. 5, circuit boards 35 and 36 are attached laterally of centric deepening 33. Circuit board 35 is provided with suitable strip conductors which serve the supply of the exciter coils 34. Accordingly, circuit board 35 is indicated as a supply circuit board. Circuit board 36 is attached on the oppositely lying side, which comprises the electronic circuit with all the required elements, which serve for the position detection of travel plate 9 relative to mono-block 4. A receiver groove 94, which is limited in length, is milled in on the lower side of travel plate 9. In this embodiment, a glass scale 19 is fixed in this receiver groove 94, for example, by way of bonding. Any glass scales 19 with suitable highly precise markings known in the art may be utilized in connection with the inventive linear motor 1. Further, an optical measurement head 20 is provided, which lies under and communicates with glass scale 19. Optical measurement head 20 on circuit board 36 detects the markings of glass scale 19 on during the travel or stroke of travel plate 9.

As shown in FIG. 5, an abutment bolt 37 is attached laterally of centric recess 33 for the mechanical securement of travel plate 9 relative to base plate 2 or to mono-block 4. This bolt 37 extends perpendicularly upwards from base plate 2, and its upper end engages into a longitudinal milled recess 93 of travel plate 9, which is limited in the longitudinal direction. Further a longitudinal recess is formed in the travel plate 9 in the surface which is directed to the base plate 2 in the installed condition, which serves for receiving a magnet unit 92.

The complete design of the guidance system of the inventive linear motor may be manufactured inexpensively despite the extremely high running accuracy. Special, solid rails of steel with a corresponding volume are not required in the inventive linear motor. Since bias rod 15 is displaceable transversely to the running direction of travel plate 9, a precise guidance may be achieved within the inventive linear motor without the need of a highly precise and expensive process.

In an alternative embodiment, the inventive linear motor may also be applied in compound table arrangements, wherein the mono-block 4 of the upper linear axis may be screwed directly, with a 90° alignment, onto the travel plate 9 of the lower linear axis, and that no intermediate plate is required. In an alternative embodiment, the inventive linear motor may comprise two mono-blocks.

While certain embodiments of the present invention have been described, it will be understood that various changes may be made in the above invention without departing from the scope of the invention. It is intended that all matter contained in the above description or shown in the accompanying drawings shall be interpreted as illustrative and not in a limiting sense.

I claim:

1. A linear motor with an integrated guidance, comprising:
   (a) a base plate comprising at least two side walls; and
   (b) a travel plate guideably connected to the base plate in a linearly movable manner,
   wherein the base plate and the two side walls form a mono-block, the mono-block comprising at least two longitudinal grooves for receiving a first runner rod and a second runner rod,
   wherein the travel plate comprises at least two longitudinal grooves for receiving a third runner rod and a fourth runner rod and is connected to a plurality of rollers that travel on the at least two longitudinal grooves of the travel plate,
   wherein cross roller cage is arranged in a floating manner between the mono-block and travel plate, the cross roller cage comprising a cage and a plurality of rollers that contact the runner rods,
   wherein a linear drive and a position measurement system are arranged in a region between the at least two longitudinal grooves of the travel plate,
   wherein a bias rod is arranged on one side in one of the at least two longitudinal grooves of the mono-block and is displaceable transversely to the running direction of the travel plate by way of a plurality of threaded bores incorporated in the corresponding side wall of the mono-block by way of pressing screws, the threaded bores being staggered in an alternating manner in the side wail,
   wherein a centric deepening is formed in the mono-block, in which a unit provided with a plurality of exciter coils is inserted, and wherein a longitudinal recess is formed in the travel plate in the surface which is directed to the base plate in the installed condition and serves for receiving a magnet unit,
   wherein a circuit board with supply leads for the exciter coils is attached laterally of the centric deepening in the mono-block along a longitudinal side, and wherein a circuit board with electronics for the position detection and the motor-specific data is attached on the other longitudinal side of the deepening, and
   wherein a receiver groove is formed in the lower side of the travel plate, which lies above the circuit board for the position detection, and in which a glass scale with an optically readable marking lies, which on movement of the travel plate, is moved past an optical measurement head which is arranged on the circuit board.

2. The linear motor of claim 1, wherein the mono-block and the travel plate are manufactured of the same materials.

3. The linear motor of claim 1, wherein the mono-block and the travel plate are manufactured of aluminum.

4. The linear motor of claim 1, wherein the mono-block and the travel plate are provided with end covers.

5. The linear motor of claim 1, wherein the travel plate and the mono-block comprise threaded holes for assembly.

6. The linear motor of claim 1, wherein an elongate recess is formed in the base plate parallel to an end-side of the mono-block, wherein two recesses are arranged between the recess and an end side in which at least one cable which is fastened on the mono-block at least partly comes to lie.

7. The linear motor of claim 1, wherein the mono-block comprises an abutment bolt projecting perpendicularly from the base plate, which with its free end engages into a limited longitudinal milled recess which defines the maximal path of the travel plate.

8. The linear motor of claim 1, wherein the linear motor further comprises additional threaded bores formed in the side walls, which serve for the assembly of the linear motor on a fixation surface.

* * * * *